Oct. 9, 1962  R. H. HARDING  3,057,032
CLAMP FOR TEST SPECIMEN
Filed Nov. 27, 1959

INVENTOR.
RONALD H. HARDING
BY William F. Wesinger
ATTORNEY 3,057,032
         Patented Oct. 9, 1962

3,057,032
CLAMP FOR TEST SPECIMEN
Ronald H. Harding, Charleston, W. Va., assignor to Union
 Carbide Corporation, a corporation of New York
 Filed Nov. 27, 1959, Ser. No. 855,829
 3 Claims. (Cl. 24—250)

This invention relates to a clamping device and more particularly to a clamping device especially suited for gripping a flexible foam specimen for tensile testing.

Flexible foams, such as urethane, are widely used for fabrication into consumer goods. However, to arrive at a valid economical evaluation of probable uses for a given flexible foam, its physical properties must be determined. The most important physical chaacteristics of flexible foams are their compressive strengths to define the nature of cushioning properties achieved and their tensile strengths to indicate handleability during fabrication into consumer goods as well as durability in use.

Tensile tests are normally carried out on expensive precision testing machines, the number of which available at a given location is limited and each of which requires an operator. The machines either pull or push on foam samples at predetermined rates, simultaneously indicating or recording the deformation induced and the force applied. Specification for standardized tensile tests calls for reporting the average test result of up to five tests on each sample, in some cases.

Since tests involving the use of machines have been largely standardized, no actual testing time may be eliminated unless some tests are eliminated or the amount of test repetition is reduced, which reduces the reliability or breadth of results. Reduction in handling time of samples during test set-up could, however, result in increased output of the testing machines with no losses in information obtained.

For compression measurements the testing machine operator need only place the samples on a platen and set his instrument. On the other hand, tensile samples must be clamped carefully in the machine. Commercially available jaws are not designed to clamp foams and are inconveinent to apply to this service.

For example, some of the clamps of the prior art rely only on friction between sample and jaw. Since a flexible foam sample could readily deform and shift in a clamp, particularly under light loads, the test specimen must be positively gripped by the jaws. Other clamps in the prior art do not provide for parallel jaw movement. Non-parallel jaw movement permits soft foams to creep between them as they close, thus inducing stresses. Also, when testing flexible foams, relative motion of the jaws induces shear between the faces of the sample contacting opposed jaws.

To appreciate the problems more fully as contrasted to the nature of a foam the materials usually encountered in tensile testing, such as metals, solid elastomers, plastics, concrete and the like, are stiff enough to be forced without significant deformation into clamping jaws which may normally be closed. Their size and shape are sufficiently stable to cause jaws of certain designs to tighten automatically through friction, upon application of a tensile force. These same physical characteristics lead to a minimum of operator motion in routing testing of uniform samples involving clamps which close by activation of a simple machine, such as a screw.

An entirely different set of considerations applies to the clamping of flexible foams which are neither stiff nor dimensionally stable. Forces of the order of a hundredth of a pound per square inch (p.s.i.) may cause them to deflect measurably when in their relaxed state. Forces around 20 p.s.i. may be required to rupture them in tension and considerably more pressure, perhaps 200 p.s.i., may be withstood by them in compression without permanent damage.

Therefore, it is the main object of this invention to provide a clamping device for use in tensile testing of flexible foams which will reduce set-up time on testing machines.

Another object is to provide jaws which themselves induce no significant internal strain in the test section of the specimen in the direction of tensile stress.

Still another object is to provide jaws which facilitate alignment of the specimen and are parallel.

A further object is to provide jaws which clamp under sufficient positive pressure to prevent the specimen from slipping out when tension is applied.

Yet another object is to provide jaws which open with sufficient clearance to provide ready entry of a specimen.

Figure 1:
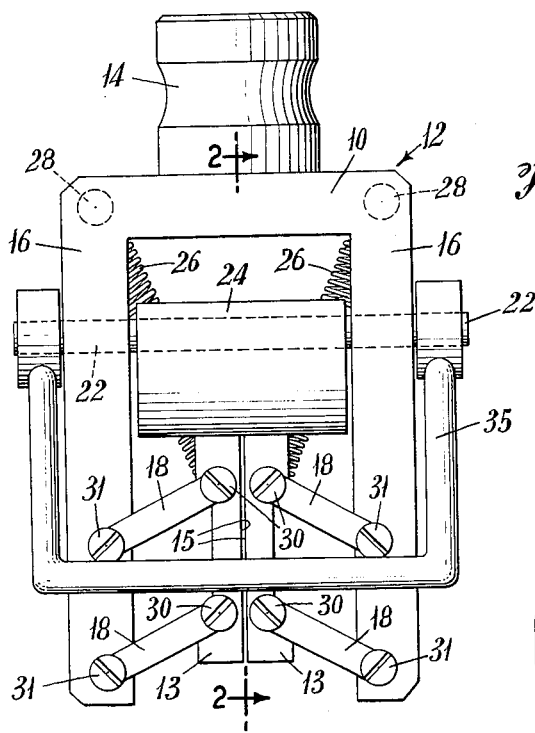
FIGURE 1 is a front elevation of the clamp of the invention in the closed position.
Figure 3:
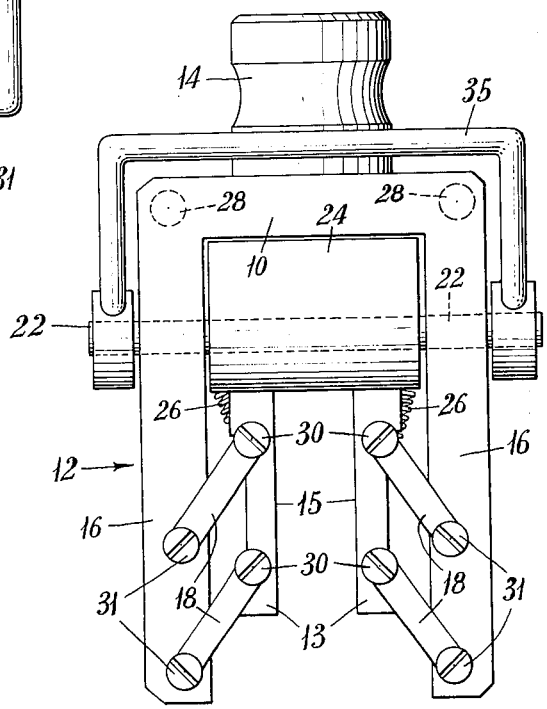
FIGURE 3 is similar to FIGURE 1 showing the clamp in the opened position.
Figure 2:
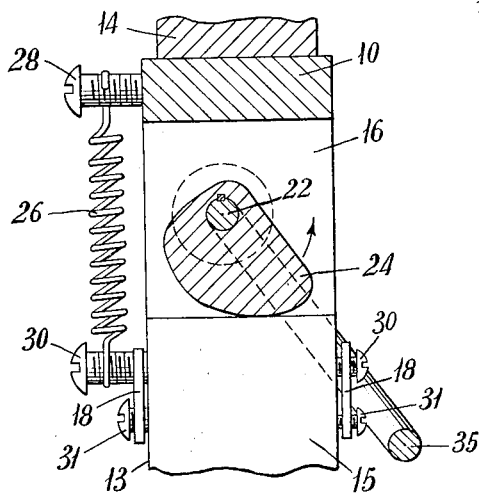
FIGURE 2 is a section taken along the line 2—2 of FIGURE 1.

The present invention provides cam-closed, parallelogram-mounted, smooth-faced jaws. A spring-opening mechanism permits semi-automatic ejection of tested samples and controls the mechanism's locking friction. The cam-and-parallelogram action provides positive parallel jaw alignment within design tolerance and automatic compensation for wear. The required clamping force may be applied with little motion of either hand without sample distortion, external stress buildup, or misalignment or pre-stressing of specimens. Jaws further tighten automatically as tension is applied. Sufficient clearance, rapid closure and reference surfaces for proper sample alignment are available without loss of accessibility to the clamping area. It is estimated experimentally that the clamp of the invention should reduce set-up time to about 10 to 20% of that required with presently available clamping devices. Also, it is expected that unloading time will be about 10% of that required with presently available clamping devices. The loading and unloading times of an experienced operator using standard Instron "C" jaws were clocked at 30 and 20 seconds per specimen.

The clamp comprises an inverted U-shaped support which is provided with a pair of gripping jaws having opposed substantially smooth gripping surfaces. A pair of parallel links pivoted on each side of each gripping jaw pivotally mount such jaws on the inner sides of each leg of the U-shaped support. This type linkage provides for parallel motion of each of the jaws to and from each other. A transverse shaft journaled in each leg of the support has keyed thereon a cam which serves to actuate the gripping jaws. A spring is provided for each gripping jaw and is located between a fastener either in the base of the support or on the drum of the handle axis and one of the fasteners joining the parallel links to the gripping jaw. This arrangement provides for constant bearing surface contact between the cam and the respective gripping jaws. A U-shaped handle is mounted to both ends of the transverse shaft. An operator standing to either side of the clamp can reach this type handle for quick and easy clamp operation.

The clamp shown in the drawings comprises a rigid inverted U-shaped support 12 which is provided with a base 10 having depending legs 16. The support 12 is provided at the outer side of base 10 with a fixture 14 by which the clamp is attached to the machine.

The support 12 carries a pair of gripping jaws 13 of dimensions appropriate to the size of the foam specimen to be tested. These jaws 13 are movably mounted on each support leg 16 by a pair of equal and parallel links 18 pivoted on each respective vertical side of the gripping jaws 13 and on each support leg 16 so that their substantially smooth gripping surfaces 15 are opposite each other. Link pivots 30 on jaws 13 are normally higher than the outer link pivots 31 on legs 16.

For actuating the gripping jaws 13, the support 12 is provided with a camshaft 22 in each support leg 16. Keyed to the camshaft 22 is cam 24.

In order to maintain the gripping jaws 13 in constant bearing surface contact with the cam 24 the support 12 carries springs 26 located respectively between a fastener 28 in the base 10 and a fastener 30 on each gripping jaw 13.

In order to impart rotational motion to the cam 24 and thus cause the jaws 13 to move toward or away from each other, a U-shaped handle 35 is adjustably mounted to the extremities of the camshaft 22.

The springs 26 load the jaws in a direction such that they tend to open if the spring is tightened. This auxiliary loading also provides for automatic release of a foam specimen when the cam 24 is withdrawn. Spring tension controls the jaws' locking force through friction on bearing surfaces.

Cam dimensions are determined by the leg-to-leg dimension of the support 12 and by the vertical travel of the jaws 13 which is required by the transition from fully open to fully closed. The angular rotation required to achieve closure depends largely on convenience, but is limited on the lower side by possible slippage of the cam and on the upper side by the geometry of nearby parts; 45 to 90° is the preferred range.

Operation of the clamp consists in simply moving the handle 35 toward or away from the support 12. This in turn actuates the cam 24. For example, if the handle 35 is moved toward the support 12, the cam 24 will force the gripping jaws 13 to move toward each other, thus closing the space therebetween, and positively grip the test specimen, preventing such specimen from slipping out when tension is applied. When the handle 35 is moved away from the support 12 the cam 24 will tend to move away from the jaws 13; however, springs 26 force the jaws 13 to remain in bearing surface contact with the cam 24. As a result the jaws will move away from each other and automatically cause the flexible foam to be ejected from the clamp.

It is to be understood that certain modifications may be made to the specific embodiment of the invention as disclosed herein without departing from the scope of such invention.

What is claimed is:

1. A clamp for tensile testing a flexible foam specimen, comprising a U-shaped support, a pair of gripping jaws having opposite surfaces for engaging said flexible foam specimen, a pair of parallel links pivoted on opposite sides of each of said gripping jaws and on the inner side of each leg of said U-shaped support for parallel motion of said gripping jaws to and from each other, a transverse shaft journaled in each leg of said U-shaped support, a laterally elongated cam keyed on said transverse shaft and having a single smooth surface engaging each of said gripping jaws, a pair of tension members between said U-shaped support and said respective gripping jaws for maintaining constant bearing surface contact between said gripping jaws and said single smooth surface of said laterally elongated cam.

2. Apparatus according to claim 1 wherein the angular rotation of said cam is from about 45 degrees to about 90 degrees.

3. Apparatus according to claim 1 wherein said pair of gripping jaws have opposed substantially smooth gripping surfaces.

References Cited in the file of this patent

UNITED STATES PATENTS

| | | |
|---|---|---|
| 531,715 | Brown | Jan. 1, 1895 |
| 675,047 | MacGarvey et al. | May 28, 1901 |
| 701,669 | Atkinson | June 3, 1902 |
| 1,221,400 | Wilheim et al. | Apr. 3, 1917 |
| 1,466,007 | Walton | Aug. 28, 1923 |
| 1,944,603 | Hecker | Jan. 23, 1934 |
| 2,012,329 | Wickersham et al. | Aug. 27, 1935 |
| 2,384,636 | Nelson | Sept. 11, 1945 |
| 2,419,711 | Dillon | Apr. 29, 1947 |
| 2,591,001 | Olpe | Apr. 1, 1952 |
| 2,600,923 | Rogers et al. | June 17, 1952 |
| 2,634,487 | Rogers | Apr. 14, 1953 |
| 2,667,092 | Schaffer | Jan. 26, 1954 |
| 2,702,929 | Laddon et al. | Mar. 1, 1955 |

FOREIGN PATENTS

| | | |
|---|---|---|
| 597,935 | Germany | June 1, 1934 |
| 736,946 | Germany | July 2, 1943 |